3,492,357
PREPARATION OF PARAFORMALDEHYDE
Leon B. Levy, Corpus Christi, Tex., assignor to Celanese Corporation, New York, N.Y., a corporation of Delaware
No Drawing. Continuation of application Ser. No. 571,725, Aug. 11, 1966. This application Sept. 6, 1968, Ser. No. 758,659
Int. Cl. C07c 47/10
U.S. Cl. 260—615.5        3 Claims

ABSTRACT OF THE DISCLOSURE

Disclosed herein is a system for preparing paraformaldehyde which process comprises polymerizing an aqueous solution with a formaldehyde in the presence of a certain tertiary amine polymerization initiator.

---

This application is a continuation of copending application Ser. No. 571,725, filed Aug. 11, 1966, and now abandoned.

The present invention relates to the production of paraformaldehyde. More particularly, the invention concerns an improved process for the catalytic preparation of paraformaldehyde from aqueous formaldehyde solutions.

The reaction mechanism whereby formaldehyde polymerizes to form paraformaldehyde is considered complex, and incapable of simple explanation. As is commonly recognized in the art, the paraformaldehyde product is believed, however, to be a mixture of polyoxymethylene glycols of the following formula:

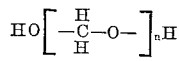

where $n$ equals at least about 6 up to about 100. In such a polymer the carbon and oxygen atoms are alternatively linked to form the resulting polyether polymer. Paraformaldehyde is also sometimes identified by the terms paraform, or polymerized formic aldehyde.

According to the prior art paraformaldehyde is commonly prepared by the evaporation or concentration of aqueous formaldehyde solutions under controlled conditions of temperature and pressure. See, for example, the process for the evaporative treatment of an aqueous formaldehyde solution disclosed in U.S. Patent No. 2,568,016 to MacLean et al. in which a product having a flake-like configuration is commonly produced. Catalysts other than possible organic acid impurities sometimes present in formaldehyde are not customarily utilized in such processes for the concentration of aqueous formaldehyde solutions. While these evaporation techniques for producing paraformaldehyde have been found to produce an entirely satisfactory product, they have required the consumption of relatively large quantities of steam or other energy source to elevate and to maintain the desired temperature conditions, and the handling of relatively large amounts of dilute aqueous formaldehyde solutions produced as evaporator distillates.

Processes for the catalytic production of paraformaldehyde have been disclosed in the past as exemplified by U.S. Patent No. 2,704,765 to Smithson in which a relatively high concentration formaldehyde vapor feed is quenched in a non-aqueous organic liquid containing any one of a wide variety of alkaline or acidic catalysts to polymerize the same. The production of a relatively high concentration formaldehyde vapor feed suitable for use in the Smithson process for a more dilute aqueous solution tends to be relatively expensive. Also, the handling of high concentration formaldehyde vapors requires careful adherence to the prescribed process conditions in order to prevent the excessive deposition of paraformaldehyde upon equipment surfaces and the concomitant fouling of the same. Additionally, it is disclosed in U.S. Patent No. 2,568,018 to MacLean et al. that the polymerization of paraformaldehyde in particulate form may be increased by subjecting the particles to a current of air containing an alkaline or acidic material.

It is an object of the present invention to provide an efficient and economical process for the catalytic production of paraformaldehyde which utilizes an aqueous solution of formaldehyde as the source of the reactants.

It is a further object of the present invention to provide an improved process for the production of paraformaldehyde which is capable of yielding a product having a powder or fine crystalline configuration.

It is still another object of the present invention to provide an improved and flexible process for the production of paraformaldehyde which may be operated on a batch or a continuous basis.

These and other objects, as well as the scope, nature, and utilization of the invention will be apparent from the following detail description and appended claims.

It has now been discovered that a preferred embodiment of an improved process for the production of paraformaldehydre comprises forming a polymerization mixture which includes about 0.05 to about 20 parts by weight of a tertiary amine polymerization catalyst selected from the group consisting of trimethylamine, triethylamine, tri-n-propylamine tri-n-butylamine, and mixtures thereof; about 30 to about 50 parts by weight of formaldehyde; and about 70 to about 50 parts by weight of water, with the total of the formaldehyde and water components equaling about 100 parts by weight; maintaining the polymerization mixture at a temperature of about 25° C. to about 110° C. until a substantial quantity of the formaldehyde present in the polymerization mixture has polymerized to form paraformaldehyde; cooling the resulting polymerization mixture until a substantial quantity of the paraformaldehyde present in the mixture has precipitated; and recovering the paraformaldehyde product.

The aliphatic tertiary amine polymerization catalyst selected for use in the present invention is preferably added to the aqueous formaldehyde solution as an anhydrous compound with enough stirring to yield a homogeneous solution. If desired, however, the trimethylamine catalyst because of its gaseous properties at room temperature, may be added as an aqueous solution, e.g. about 25 percent by weight. Also, the trimethylamine gas may be sparged into the aqueous formaldehyde solution until the desired catalyst concentration is reached. It has been found that when the tertiary amine catalyst or mixtures thereof are present in the stated concentration range of about 0.05 to about 20 percent by weight based upon the total weight of the formaldehyde and aqueous components of the system that the polymerization reaction progresses at a readily controllable rate. The preferred catalyst concentration range is about 0.3 to about 10 percent by weight based upon the total weight of the formaldehyde and aqueous components of the system. Trimethylamine and triethylamine are the preferred catalysts. Triethylamine in a concentration of about 5 percent by weight is the particularly preferred catalyst. Standard safety precautions for handling these flammable compounds must also be observed at all times.

The water and formaldehyde components of the polymerization system are suitably present in concentration which initially produces a solution of about 30 to about 50 percent by weight formaldehyde based upon the total weight of these two components. If formaldehyde is initially present in the water solution in a concentration much below about 30 percent by weight then significantly reduced yields of product are obtained. If formaldehyde is initially present in the water solution in a concentration much in excess of about 50 percent by weight then the product ultimately obtained tends to be amorphous rather than crystalline. The preferred concentration for the formaldehyde component is about 35 to 45 percent by weight. The particularly preferred concentration range has been found to be about 40 percent formaldehyde by weight.

The initial polymerization reaction may be conducted under autogenous temperature conditions which result when the reactants are initially mixed at about room temperature for a period of at least about 10 minutes. During the initial polymerization reaction the autogeneous temperature of the polymerization mixture customarily ranges between about 25° C. to about 40° C., depending upon the specific quantity of tertiary amine catalyst selected. When relatively large quantities of catalyst are utilized the reaction tends to be slightly exothermic and will commonly rise to at least the upper portion of the 25° C. to 40° C. temperature range. Polymerization temperatures within the broader range of about 25° C. to about 110° C. may also be employed in the instant embodiment. For instance, when the aqueous formaldehyde solutions are relatively more concentrated and initially comprise about 50 percent formaldehyde by weight then it is recommended that the reaction mixture be heated by any suitable means to a temperature generally above the autogeneous reaction temperature and up to about 110° C. prior to the precipitation step if maximum process efficiency is desired. The preferred initial polymerization reaction time is about 10 minutes to about 40 minutes. If desired, a polymerization reaction time in excess of 40 minutes may be utilized if a product of a relatively high molecular weight is desired.

Following the completion of the initial polymerization step of the instant embodiment the normally clear solution containing dissolved product is cooled in order to precipitate a substantial quantity of the paraformaldehyde present therein. For example, in batch operations the precipitation may be performed by slowly cooling the resulting polymerization mixture to a temperature between about 0° C. to about 10° C., and preferably to a temperature of about 0° C. The preferred cooling rate does not exceed about 10° C. of cooling per minute and is preferably between about 0.5° C. to about 10° C. per minute. When the initial aqueous formaldehyde solution is relatively more concentrated and comprises up to about 50 percent formaldehyde by weight then it has been found that a superior ultimate product is produced if the cooling step is conducted at the rate of about 0.5° C. per minute. Also, when relatively concentrated formaldehyde solutions are utilized, e.g. about 50 percent formaldehyde by weight, then it is possible for precipitation to occur well above the 0° C. to 10° C. range, i.e., about 25° C. and it is not necessary for the cooling step to preceed the 0° C. to 10° C. range. Agitation of the reaction mixture is recommended throughout the cooling step during which time polymerization continues. In order to accomplish the effective precipitation of a substantial quantity of the paraformaldehyde initially dissolved in the solution, the polymerization mixture is preferably maintained at the depressed temperature for at least about 5 minutes and preferably for about 5 to 30 minutes. In a particularly preferred embodiment of the invention the solution is held at about 0° C. for about 15 minutes.

In continuous operations following the initial polymerization step of the preferred embodiment of the normally clear solution containing dissolved product may be introduced directly into a quantity of previously obtained product solution containing precipitated polymer which is maintained at a relatively depressed temperature as indicated above.

In a further embodiment of the invention the initial polymerization step of the instant process described heretofore is omitted and aqueous formaldehyde solution containing a tertiary amine catalyst is immediately cooled following its formation. As in the preferred embodiment, the present embodiment may be operated on either a batch or a continuous basis. The polymerization of formaldehyde to produce paraformaldehyde in the instant embodiment, occurs largely during the cooling step described above. The product formed in the instant embodiment while suitable for use in a wide variety of applications described hereafter, does, however, commonly lack some of the extremely fine crystalline properties which are produced by following the preferred embodiment of the present invention.

Immediately prior to the recovery step of the instant process further polymer formation may be encouraged at the surface of the precipitated polymer by allowing the mixture to stand for a period of time at room temperature. Such a procedure is considered optional.

The solid paraformaldehyde product may next be recovered by any suitable technique such as filtration or centrifugation. If desired, the product may also be treated with one or more organic solvents to displace adhering traces of moisture or catalyst and to aid in the formation of a product exhibiting highly crystalline properties. The initial solvent treatment is preferably conducted by utilizing a water soluble solvent which is relatively inert toward paraformaldehyde such as acetone, tetrahydrofuran, dioxane, methanol, ethanol, etc. A secondary solvent treatment to remove the higher boiling initial solvent may be used. The secondary solvent should preferably possess a relatively low boiling point, be miscible with the first solvent, and possess a relatively poor ability to wet the product. For example, ether may suitable be used in the secondary solvent treatment. The washing of the product may be accomplished in a variety of ways such as by stirring the product present within a filtration apparatus with the organic solvent, or by introducing the solvent into a suitable solid bowl centrifuge which contains a quantity of the reaction slurry. Following washing it may be desirable to further treat the product by vacuum drying or by any other suitable drying technique. If paraformaldehyde of relatively low molecular weight is desired as little heat as is necessary to dry the product should be employed.

As indicated previously, the present invention is adaptable for use on either a batch or a continuous basis. In a continuous operation the aqueous formaldehyde solution and the tertiary amine catalyst may be continuously introduced into an appropriate reaction system in which the temperatures and average residence times are adjustably controlled in order to most efficiently yield the product.

The following examples are given as specific illustrations of the invention. It should be understood, however, that the invention is not limited to the specific details set forth in the examples.

EXAMPLE I

The present example is illustrative of the operation of the invention on a batch basis.

91 milliliters (100 grams) of a 40 percent aqueous formaldehyde solution at a room temperature of 25° C. were placed in a 250 ml. vessel. 6.9 milliliters (5.0 grams) of anhydrous triethylamine were added with stirring to form a homogeneous mixture. The polymerization reaction was allowed to proceed for 10 minutes during which time the autogenous reaction temperature rose to 30° C. The clear reaction mixture was next slowly cooled by gently swirling in an ice bath to the temperature of 0° C. over a period of 10 minutes. The reaction mixture was maintained at 0° C. with continued stirring for 15 minutes during which time a white paraformaldehyde precipitate became visible. The product was recovered by the use of suction filtration. The precipitate was next washed three times with acetone, vacuum dried, slurried with ether, and filtered. The product which weighed 19.7 grams was found to be 95.9 percent paraformaldehyde by weight and was produced in yield of 47 weight percent. It possessed fine crystalline properties and a molecular weight of 720.

EXAMPLE II

The present example is illustrative of the operation of the invention on a continuous basis.

The polymerization system utilized was operated continuously for 2 to 3 hours prior to the starting of the instant run. 1021 ml. (1133 grams) of a 40 percent aqueous formaldehyde solution and 33 grams of a 25 percent aqueous solution of trimethylamine were introduced into the polymerization zone over a period of 2 hours. The polymerization zone was formed by a pair of spiral condensers joined in series. The total capacity of the spiral condensers was 70 cc. Jackets were provided around the spiral condensers through which water at a temperature of 40° C. was circulated. The average residence time of the polymerization mixture within the polymerization zone was 8 minutes. The resulting polymerization mixture was continuously introduced into a 420 cc. jacketed precipitation reactor provided with a central stirrer. The precipitation reactor was maintained at a temperature of 10° C. by water circulating through the jacket. The average residence time of the resulting polymerization mixture in precipitation reactor was 25 minutes. A product slurry was continuously withdrawn through the base of the precipitation reactor. The catalyst in the product slurry was neutralized to a pH of 6, batchwise filtered by suction, washed three times with acetone, washed one time with ether, and vacuum dried at 25 to 30° C. The product weighed 243 grams and assayed as 82.1 percent formaldehyde. The yield was calculated to be 44 weight percent. The dried paraform possessed a fine crystalline configuration and had a molecular weight of 950.

The paraformaldehyde produced by the present process may be used in the formation of phenol-formaldehyde, urea-formaldehyde and other known types of synthetic resins, or as a disinfectant, fumigant, or fungicide. Since it is possible to produce a product by use of the present invention which possesses fine crystalline properties, the grinding of resulting polymer flakes as is common according to prior art processes is not necessary. Under proper conditions paraformaldehyde produced by the present process is suitable in almost any chemical reaction which calls for formaldehyde.

Although the invention has been described with preferred embodiments, it is to be understood that variations and modifications may be resorted to as will be apparent to those skilled in the art. Such variations and modifications are to be considered within the purview and scope of the claims appended hereto.

What is claimed is:

1. A process for the production of paraformaldehyde which comprises forming a polymerization mixture which includes about 0.3 to about 10 parts by weight of a tertiary amine selected from the group consisting of trimethylamine, triethylamine, tri-n-propylamine, tri-n-butylamine, and mixtures thereof; about 35 to about 45 parts by weight of formaldehyde; and about 65 to about 55 parts by weight of water, with the total of the formaldehyde and water components equaling about 100 parts by weight; maintaining the polymerization mixture at a temperature of about 25° C. to about 40° C. for about 10 minutes to about 40 minutes; slowly cooling the resulting polymerization mixture at a rate which does not exceed about 10° C. of cooling per minute, to a depressed temperature of about 0° C. to about 10° C.; maintaining the resulting polymerization mixture at said depressed temperature of about 0° C. to about 10° C. for about 5 minutes to about 30 minutes to precipitate the paraformaldehyde product; and recovering the paraformaldehyde product.

2. A process according to claim 1 in which the catalyst is trimethylamine.

3. A process according to claim 1 in which the catalyst is triethylamine.

References Cited

UNITED STATES PATENTS

| | | |
|---|---|---|
| 2,092,422 | 9/1937 | Naujoks. |
| 2,153,526 | 4/1939 | Walker. |
| 2,704,765 | 3/1955 | Smithson. |
| 2,768,994 | 10/1956 | MacDonald. |
| 2,953,602 | 9/1960 | Aries. |
| 3,300,535 | 1/1967 | Yakimik. |

LEON ZITVER, Primary Examiner

HOWARD T. MARS, Assistant Examiner